March 13, 1956  F. KÄSER  2,737,720
TOOL GUIDING DEVICE
Filed Aug. 21, 1951
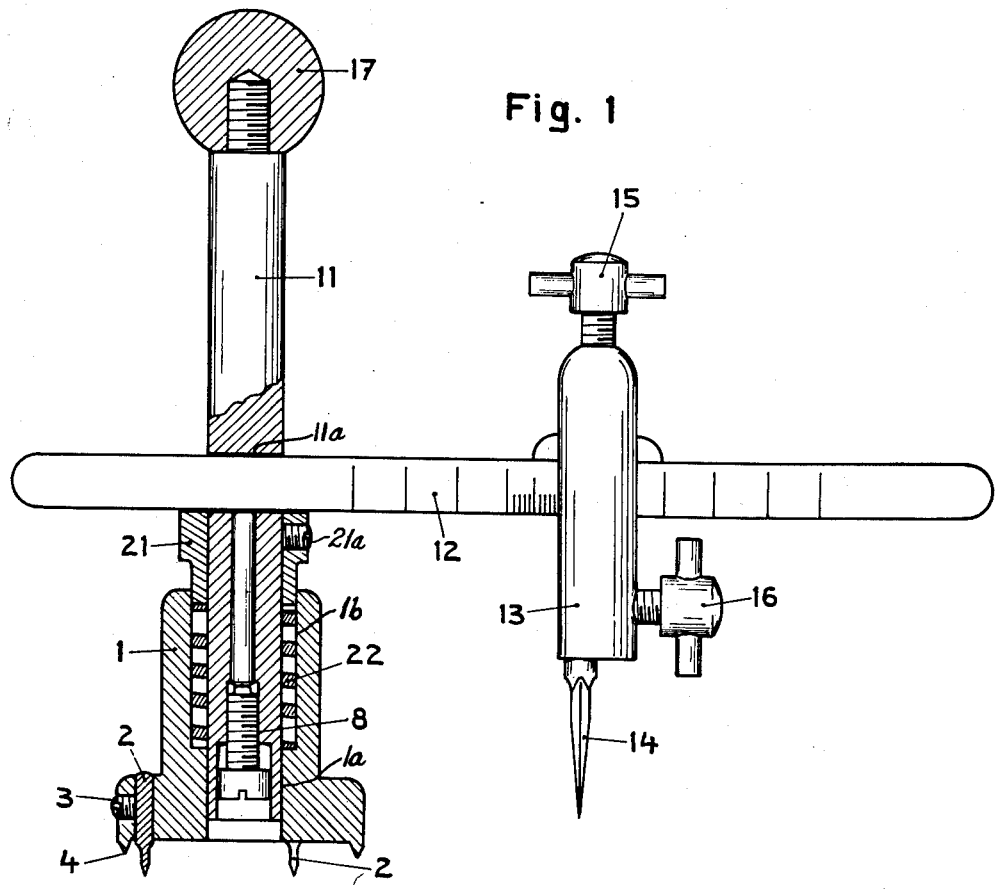
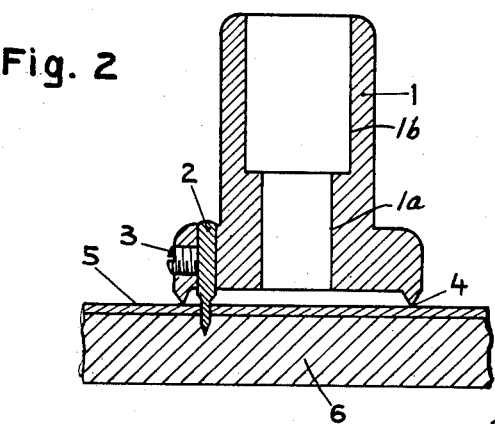
INVENTOR.
Fritz Käser
BY

United States Patent Office 2,737,720
Patented Mar. 13, 1956

2,737,720

TOOL GUIDING DEVICE

Fritz Käser, Zurich, Switzerland

Application August 21, 1951, Serial No. 242,920

Claims priority, application Switzerland, August 24, 1950

2 Claims. (Cl. 30—310)

This invention relates to a tool guiding device and more particularly to a circle cutting apparatus particularly suitable for cutting rings, such as annular gaskets, from material in sheet form.

According to this invention, the apparatus comprises a supporting base member having a bottom face adapted to engage a surface, the base member being formed with a stepped cylindrical bore having a wider portion and a smaller portion opening on the bottom face; shaft means having one end portion turnably and slidably mounted in the bore and being movable in axial direction between a retracted position and a position advanced toward the bottom face of the base member; a handle piece secured to the other end of the shaft means; a sleeve member fixed to the shaft means and having a projecting portion engaging the base member in the advanced position of the shaft means, the sleeve member being turnably and slidably mounted in the wider portion of the bore in the base member; spring means located in the wider portion of the bore abutting against the base member and the sleeve member and urging the shaft means to the retracted position; arm means secured to the shaft means and projected in radial direction; a tool holder means slidably mounted on the arm means; and means for fixing the tool holder means on said arm means.

In the advanced position of the shaft means, a tool, such as a cutter, held by the tool holder means engages the surface engaged by the bottom face of the base member, and manual rotation of the arm means by one hand of the operator, while the hand piece is depressed by the other hand of the operator, effects a circular movement of the tool about the axis of the shaft means.

One example of carrying the invention into effect is shown in the accompanying drawing, wherein:

Fig. 1 is a side elevation of the apparatus, shown partly in section, and

Fig. 2 is a vertical section through the supporting base member.

The cutting apparatus shown in Fig. 1 is operated by hand and has a rotatable axle or shaft 11 to which a supporting arm 12 for a tool holder 13 is secured by means of a screw 8 located in a central bore in the shaft and extending to the transverse bore 11a in which the supporting arm 12 is slidably arranged. The tool holder 13 may be moved in the longitudinal direction along the arm 12 and carries at its lower end a cutter 14 slidably mounted in said holder. The cutter 14 is locked in position by means of a thumbscrew 16. The sliding adjustment of the tool holder 13 may be determined by a graduated scale on the arm 12. A thumbscrew 15 locks the cutter holder 13 in position. The shaft 11 has a hand grip 17.

The lower end portion of the shaft 11 is inserted in the smaller portion 1a of a stepped cylindrical central bore of a supporting base member 1, the upper portion 1b of the bore having an enlarged diameter to receive a spring 22. This spring is engaged by a sleeve member 21 fixed to the shaft 11 by a screw 21a. The sleeve member 21 is turnable and slidable in the bore portion 1b and guides the shaft 11 in the upper portion of supporting base member 1. By virtue of this arrangement it is possible to move the shaft 11 in the axial direction against the pressure of the spring 22. Axially movable spikes 2 are carried by the lower portion of the supporting base member 1 and are clamped in position by grub screws 3.

The underside of the supporting base member 1 has a contoured peripheral edge extending completely around its periphery and having a depth less than the length of the spikes 2.

The apparatus is operated in the following manner:

To cut a ring out of a flat sheet of material 5 (Fig. 2), the latter is placed on a suitable support 6, as shown in Fig. 2. The shaft 11, together with the parts attached to it—and if desired together with the spring 22—is removed from the supporting base member 1, which is then placed on the material 5 and firmly pressed into the support, whereby the spikes 2 are caused to penetrate the material 5 and the support 6. The shaft 11—together with the parts attached to it (and also the spring 22 if this has been removed)—is then re-inserted in the supporting base member. A ring is cut out of the material by turning the cutter 14 and exerting so much pressure on the handle 17 against the action of the spring 22 that the cutter is forced into the material 5.

The spikes hold down the material to be cut and the supporting base member 1 so firmly that cutting can be performed with great ease and a perfect cut is obtained. The material is additionally held down by the edge 4 which prevents displacement of the material from the spikes 2.

The edge 4 can be formed in a great variety of ways; thus, for example, instead of the wedge-shaped cross-section illustrated, it can have a rectangular cross-section. The edge may extend around the whole or part of the periphery; it may also be made up of several contour sections. Furthermore, it may be grooved or serrated on its under surface which contacts the material to be cut.

It is, of course, also feasible to provide, for example, two cutters instead of one so that a ring can be cut in a single operation.

The illustrated spikes 2 for the location of the guide body are not absolutely necessary for carrying out the invention, because the pressure exerted by means of the handle 17 against the spring 22 in many cases affords sufficient rigidity.

In such a case, the clamping of the material 5 is entirely achieved by the edge 4.

The cutting apparatus hereinbefore described enables very clean cuts to be made and is of very simple design. In addition, it can be installed anywhere without any special setting up and requires no auxiliary devices other than a support.

What I claim is:

1. A tool guiding device, comprising in combination, a supporting base member having a bottom face adapted to frictionally engage a surface, said base member being formed with a stepped cylindrical bore having a wider portion, and a smaller portion opening on said bottom face; shaft means having one end portion turnably and slidably mounted in said bore, said shaft means being movable in axial direction in said bore between a retracted position and a position advanced toward said bottom face; a hand engaging piece secured to the other end of said shaft means and adapted to be manually engaged for moving said shaft means to said advanced position; a sleeve member secured on said shaft means and having a projecting portion engaging said base member in said advanced position of said shaft means, said sleeve member being turnably and slidably mounted in said wider portion of said bore; spring means located in said wider portion of said bore abutting against said base member and said sleeve member and surrounding said shaft means to urge said shaft means to said retracted position; arm means secured to said shaft means and projecting in radial direction; a tool holder means slidably mounted on said arm means, said tool holder means and said arm means being adapted to be manually engaged for turning said shaft means in said bore; and means for fixing said tool holder means on said arm means so that in said advanced position of said shaft means a tool secured to said tool holder means is adapted to engage the surface engaged by said bottom face.

2. A tool guiding device, comprising, in combination, a supporting base member having a bottom face adapted to frictionally engage a surface, said base member being formed with a stepped cylindrical bore having a wider portion, and a smaller portion opening on said bottom face; spikes secured to said base member and projecting from said bottom face; shaft means having a transverse bore and having one end portion turnably and slidably mounted in said stepped cylindrical bore, said shaft means being movable in axial direction in said bore between a retracted position and a position advanced toward said bottom face; a hand engaging piece secured to the other end of said shaft means and adapted to be manually engaged for moving said shaft means to said advanced position; a sleeve member secured on said shaft means and having a projecting flange portion engaging said base member in said advanced position of said shaft means, said sleeve member being turnably and slidably mounted in said wider portion of said bore; spring means located in said wider portion of said bore abutting against said base member and said sleeve member and surrounding said shaft means to urge said shaft means to said retracted position; means for securing said sleeve member in adjusted position to said shaft means; arm means slidable in said transverse bore of said shaft means and projecting in radial direction; screw means extending into said one end of said shaft means and to said transverse bore for fixing said arm means to said shaft means; a tool holder means slidably mounted on said arm means, said tool holder means and said arm means being adapted to be manually engaged for turning said shaft means in said bore; and means for fixing said tool holder means on said arm means so that in said advanced position of said shaft means a tool secured to said tool holder means is adapted to engage the surface engaged by said bottom face.

References Cited in the file of this patent

UNITED STATES PATENTS

| 376,974 | Wunderlich | Jan. 24, 1888 |
| 790,735 | Martin | May 23, 1905 |
| 1,189,487 | Roth | July 4, 1916 |
| 1,519,815 | Vance | Dec. 16, 1924 |
| 1,670,628 | Mahin | May 22, 1928 |
| 2,194,409 | Stangohr | Mar. 19, 1940 |
| 2,368,908 | Witter et al. | Feb. 6, 1945 |